(12) United States Patent
Ahmed et al.

(10) Patent No.: US 7,477,849 B2
(45) Date of Patent: Jan. 13, 2009

(54) MULTILEVEL AMPLITUDE MODULATED SIGNALING IN FIBRE CHANNEL

(75) Inventors: Ali U. Ahmed, Macungie, PA (US); Robert D. Brink, Coopersburg, PA (US); Gregory W. Sheets, Bangor, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 499 days.

(21) Appl. No.: 10/998,679

(22) Filed: Nov. 29, 2004

(65) Prior Publication Data

US 2006/0114811 A1    Jun. 1, 2006

(51) Int. Cl.
*H04B 10/02* (2006.01)
(52) U.S. Cl. ...................... 398/162; 398/186
(58) Field of Classification Search ................ 398/162, 398/186
See application file for complete search history.

(56) References Cited

U.S. PATENT DOCUMENTS

| 2003/0165126 A1* | 9/2003 | Sugita ............... 370/332 |
| 2003/0180055 A1* | 9/2003 | Azadet ............. 398/183 |
| 2005/0191059 A1* | 9/2005 | Swenson et al. ...... 398/159 |

* cited by examiner

*Primary Examiner*—Leslie Pascal
(74) *Attorney, Agent, or Firm*—Ryan, Mason & Lewis, LLP

(57) ABSTRACT

In a communication system comprising first and second nodes, a multilevel amplitude modulated signaling technique is utilized. The first and second nodes may communicate over a Fibre Channel link or other medium. The first and second nodes comprise respective transmitter and receiver pairs, with the transmitter of the first node configured for communication with the receiver of the second node and the receiver of the first node configured for communication with the transmitter of the second node. The first node is configured to generate a signal for transmission over a serial data channel to the second node, the signal having a multilevel amplitude modulated format in which, within a given clock cycle of the signal, multiple bits are represented by a given signal level.

16 Claims, 5 Drawing Sheets

NRZ

PAM-4

MULTILEVEL AMPLITUDE MODULATED SIGNALING IN FIBRE CHANNEL

FIELD OF THE INVENTION

The present invention relates generally to communication systems, and more particularly to signaling techniques for use in communications systems comprising, by way of example, one or more Fibre Channel links or other serial data channels.

BACKGROUND OF THE INVENTION

As is well known, Fibre Channel (FC) is an American National Standards Institute (ANSI) standard specifying a bidirectional serial data channel, structured for high performance capability. Physically, the Fibre Channel may be viewed as an interconnection of multiple communication points, called N_Ports, interconnected by a link comprising a switching network, called a fabric, or a point-to-point link. Fibre is a general term used to cover all physical media types supported by the Fibre Channel, such as optical fibre, twisted pair, and coaxial cable.

The Fibre Channel provides a general transport vehicle for Upper Level Protocols (ULPs) such as Intelligent Peripheral Interface (IPI) and Small Computer System Interface (SCSI) command sets, High-Performance Parallel Interface (HIPPI) data framing, IP (Internet Protocol), IEEE 802.2, and others. Proprietary and other command sets may also use and share the Fibre Channel, but such use is not defined as part of the Fibre Channel standard.

Fibre Channel is structured as a set of hierarchical functions denoted FC-0, FC-1, FC-2, FC-3 and FC-4.

FC-0 defines the physical portions of the Fibre Channel including the fibre, connectors, and optical and electrical parameters for a variety of data rates and physical media. Coax and twisted pair versions are defined for limited distance applications. FC-0 provides the point-to-point physical portion of the Fibre Channel. A variety of physical media is supported to address variations in cable plants.

FC-1 defines the transmission protocol which includes the serial encoding, decoding, and error control.

FC-2 defines the signaling protocol which includes the frame structure and byte sequences.

FC-3 defines a set of services which are common across multiple ports of a node.

FC-4 is the highest level in the Fibre Channel standard. It defines the mapping, between the lower levels of the Fibre Channel and the IPI and SCSI command sets, the HIPPI data framing, IP, and other ULPs.

Additional details regarding these and other aspects of Fibre Channel can be found in the ANSI Fibre Channel standard documents, including the FC-PH, FC-FS, FC-AL-2, FC-PI, FC-DA, FC-MI and FC-LS documents, all of which are incorporated by reference herein.

In typical conventional practice, Fibre Channel links are designed to operate at data rates of 4.25 Gbps, 2.125 Gbps or 1.0625 Gbps. Although higher data rates are possible, the industry is reluctant to spend money upgrading existing hardware to implement these higher data rates. The problem is that as data rates increase, to the proposed Fibre Channel rates of 8.5 Gbps, 17 Gbps and higher, the existing hardware degrades the electrical signals. As a result, it may be difficult to achieve desired levels of performance without the use of sophisticated transmit and receive equalization techniques.

Fibre Channel currently utilizes a non-return-to-zero (NRZ) signaling format, in which a single bit is transmitted per clock cycle. However, increasing the data rate beyond the 4.25 Gbps supported by the existing standard, while continuing to use NRZ signaling, will require a substantial increase in the size and power consumption of the physical layer (PHY) hardware, and thus may not be cost effective. This is particularly problematic in the case of application specific integrated circuits (ASICs) or other implementations involving large channel counts, for example, channel counts between about eight and 100, where the PHY hardware size and power will typically be dominated by the Serializer/Deserializer or "SerDes."

Accordingly, improved signal transmission techniques are needed, for use in Fibre Channel or other serial data channels, so as to accommodate higher data rates while avoiding substantial increases in the size and power consumption of the SerDes and other physical layer hardware.

SUMMARY OF THE INVENTION

The present invention provides signaling techniques, suitable for use in Fibre Channel or other serial data channels, that overcome one or more of the drawbacks of conventional practice.

In accordance with one aspect of the invention, a signaling technique is implemented in a communication system comprising first and second nodes. The first and second nodes may communicate over a Fibre Channel link or other medium. The first and second nodes comprise respective transmitter and receiver pairs, with the transmitter of the first node configured for communication with the receiver of the second node and the receiver of the first node configured for communication with the transmitter of the second node. The first node is configured to generate a signal for transmission over a serial data channel to the second node, the signal having a multilevel amplitude modulated format in which, within a given clock cycle of the signal, multiple bits are represented by a given signal level. The second node may be similarly configured, so as to communicate information to the first node using the same multilevel amplitude modulated signaling format used by the first node.

In accordance with another aspect of the invention, the first node may be configured to provide automatic activation of a particular one of a plurality of supported signaling formats, including the multilevel amplitude modulated format, based on detection of signaling capability of the second node, for use in communication with the second node over the serial data channel. Each of the supported signaling formats may be associated with a different data rate. The first node may be configured to switch between utilization of at least a first one of the signaling formats and a second one of the signaling formats responsive to detection of a data rate supportable by the second node. For example, the first node may be configured to utilize the NRZ signaling format for data rates up to about 4.25 Gbps, and to utilize the multilevel amplitude modulated format for data rates above about 4.25 Gbps.

In an illustrative embodiment, the multilevel amplitude modulated format more specifically comprises a four-level pulse amplitude modulated (PAM-4) format in which, within a given clock cycle of the signal, a pair of bits is represented by the given signal level. In this embodiment, the first node generates a signal by framing a bit sequence in a Fibre Channel frame structure, channel coding the framed bit sequence, and encoding the channel coded framed bit sequence utilizing the four-level pulse amplitude modulated signaling format.

The illustrative embodiment provides a number of significant advantages over the conventional techniques previously described. For example, the illustrative embodiment can accommodate higher Fibre Channel data rates, such as data rates above 4.25 Gbps, without substantial increases in the size and power consumption of the SerDes or other physical layer hardware. As a more particular example, if the physical layer hardware of the system operates at the clock frequency associated with the maximum currently-supported Fibre Channel data rate of 4.25 Gbps, use of the PAM-4 format in place of the NRZ format will provide a doubling in the effective data rate, to 8.5 Gbps, without increasing the operating clock frequency of the physical layer hardware.

DETAILED DESCRIPTION OF THE INVENTION

The invention will be illustrated herein in conjunction with exemplary communication systems comprising one or more bidirectional point-to-point serial data channels configured in accordance with the ANSI Fibre Channel standard. It should be understood, however, that the invention is more generally applicable to any system comprising one or more serial data channels in which it is desirable to provide improved performance at high data rates while avoiding substantial increases in the size and power consumption of physical layer hardware. For example, it will be readily apparent to those skilled in the art that the described techniques can be adapted in a straightforward manner to a wide variety of other types of serial links.

Figure 1:
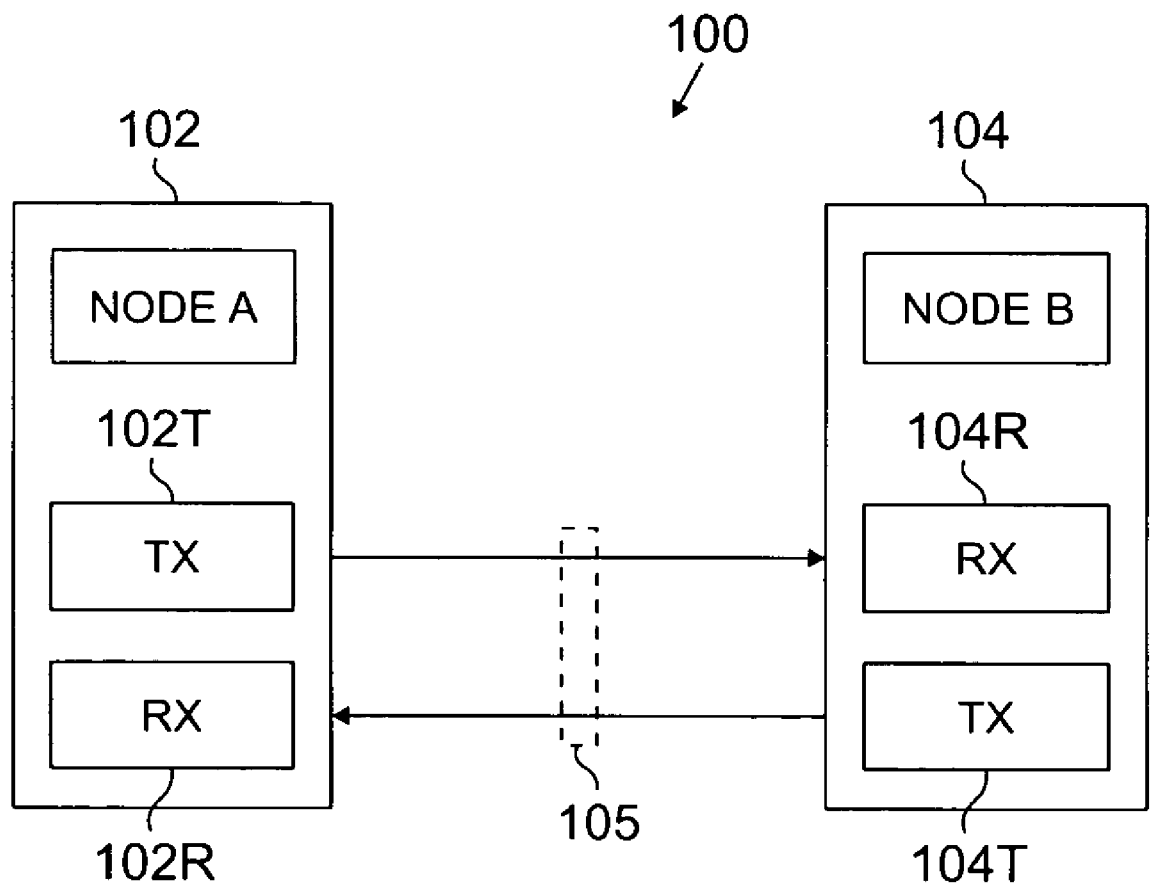
FIG. 1 is a simplified block diagram showing an exemplary Fibre Channel communication system in which the present invention is implemented.

FIG. 1 shows a portion of a communication system 100 in which the present invention is implemented. The system 100 comprises a first node 102, also denoted as Node A, and a second node 104, also denoted as Node B. The two nodes are connected by a bidirectional serial data channel transmission medium 105, also referred to herein as a "link." Node A comprises a transmitter 102T configured for communication with a receiver 104R of Node B, and a receiver 102R configured for communication with a transmitter 104T of Node B.

In one possible configuration of the system 100, Node B in FIG. 1 may be configured as a backplane which connects two or more switch ASICs implementing E_Ports, not explicitly shown in the figure. Node B may alternatively be configured as a backplane providing point-to-point connections to a plurality of NL_Ports or FL_Ports that may be, for example, Fibre Channel Hard Disk Drives (HDDs), also not shown. Thus, the Node B transceivers may be illustratively part of a backplane that is comprised of E_Ports, NL_Ports or FL_Ports. However, the invention is applicable to numerous alternative configurations, possibly using other types of ports, such as N_Ports or F_Ports on a backplane, or within a fabric, as defined in the above-cited documents of the Fibre Channel standard. Similar configurations are possible for Node A, or other nodes of a given multi-node system.

Such configurations may support multiple data rates, such as, for example, data rates on the order of 4, 8, 10 and 16 Gbps. As a more specific example, in an arrangement utilizing data rates which are multiples of the maximum data rate of 4.25 Gbps supported by the current Fibre Channel standard, higher data rates of 8.5 Gbps, 17 Gbps, and so on, may be used.

It is to be appreciated that the particular number of nodes shown in FIG. 1, and their particular topology and configuration, are presented by way of illustrative example only. Other embodiments of the invention can include different numbers and arrangements of nodes. For example, various topologies based on fabric interconnection of the nodes are possible. The invention is also applicable to topologies such as those described in the above-cited FC-DA document of the Fibre Channel standard, as well as other Fibre Channel topologies.

The present invention in the illustrative embodiment provides improved signaling techniques in a Fibre Channel system such as system 100 of FIG. 1. Advantageously, these techniques in the illustrative embodiment are suitable for accommodating higher Fibre Channel data rates than those supported using conventional NRZ signaling, such as, for example, data rates above 4.25 Gbps.

Generally, a first node, which may be Node A or Node B, is configured to generate a signal for transmission over a serial data channel to a second node, the signal having a multilevel amplitude modulated format in which, within a given clock cycle of the signal, multiple bits are represented by a given signal level. In an illustrative embodiment, to be described below, the multilevel amplitude modulated format comprises a four-level pulse amplitude modulated format in which, within the given clock cycle of the signal, a pair of bits is represented by the given signal level. Typically, the second node is configured in a manner similar to the first node, such that information is communicated from the second node to the first node using the same multilevel amplitude modulated signaling format.

Within a Fibre Channel system such as system 100 of FIG. 1, both of the nodes in a given pair of communicating nodes, that is, both Node A and Node B in system 100, comprise transceivers configured to communicate signals to one another utilizing a multilevel amplitude modulated format.

In the illustrative embodiment, the system 100 may be configured such that the multilevel amplitude modulated signaling format is used for higher data rates, such as data rates above 4.25 Gbps, while conventional NRZ signaling is used for lower data rates, such as data rates of 4.25 Gbps or less.

Figure 2:
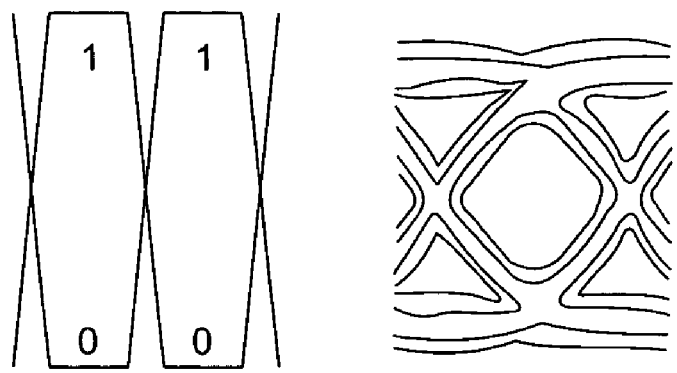
FIG. 2 shows an example of an NRZ signaling waveform, suitable for use in the FIG. 1 system in conjunction with lower data rates, for example, data rates of about 4.25 Gbps or less.

FIG. 2 shows an example of an NRZ signaling waveform suitable for use in the FIG. 1 system in conjunction with lower data rates. The signaling waveform is on the left side of the figure, and a corresponding eye diagram is shown on the right side of the figure. In the NRZ signaling waveform, also referred to as a binary waveform, a single bit is represented by a given signal level within a given clock cycle of the signal. Thus, in an NRZ format, there are only two levels, such that a single bit, of value 0 or 1, is represented within a given clock cycle of the signal.

Figure 3:
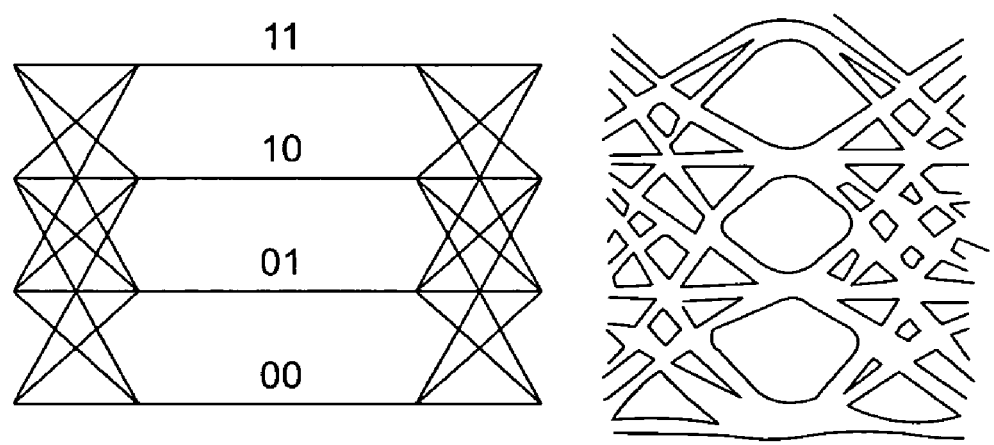
FIG. 3 shows an example of a multilevel amplitude modulated signaling waveform suitable for use in the FIG. 1 system in conjunction with higher data rates, for example, data rates above about 4.25 Gbps.

FIG. 3 shows an example of a multilevel amplitude modulated signaling waveform suitable for use in the FIG. 1 system in conjunction with higher data rates. Again, the signaling waveform is on the left side of the figure, and a corresponding eye diagram is shown on the right side of the figure. This exemplary format is referred to herein as a PAM-4 format, and utilizes four different levels, each corresponding to a different pair of bits. More specifically, the four levels, when viewed in order from highest to lowest, denote the bit pairs 11, 10, 01 and 00, respectively. Thus, a given one of the levels is used to represent the corresponding pair of bits within a given clock cycle of the signal.

The notation "PAM-x" as used herein generally denotes pulse amplitude modulated signaling, with x denoting the number of different levels. Thus, in a PAM-4 format, there are four levels, such that one of the four possible pairs of bits can be represented by a given one of the levels within a given clock cycle of the signal.

It is to be appreciated that the use of four levels in the illustrative embodiment is by way of example only, and more levels can be used such that a given level represents more than two bits within a given cycle of the signal. For example, eight levels can be used to represent three bits. More specifically, if the number of bits to be represented in a given cycle of the signal is given by y, this number is related to the number of levels x by the equation $x=2^y$.

The PAM-4 multilevel amplitude modulated format of FIG. 3 provides an efficient mechanism for transmitting multiple bits per clock cycle in a Fibre Channel system. For example, if the physical layer hardware of the system operates at the clock frequency associated with the maximum currently-supported Fibre Channel data rate of 4.25 Gbps, use of the PAM-4 format in place of the NRZ format will provide a doubling in the effective data rate, to 8.5 Gbps, without increasing the operating clock frequency of the physical layer hardware. Thus, use of a multilevel amplitude modulated format in a Fibre Channel system in accordance with the invention allows the physical layer hardware of the system to operate at the existing 4.25 Gbps clock frequency while supporting data rates of 8.5 Gbps, 17 Gbps and higher. The use of the PAM-4 format will not increase power consumption since the physical layer operating frequency is unchanged while the effective data rate is doubled. It should be noted that the use of PAM-4 or other multilevel amplitude modulated format will typically require additional coding and decoding logic in the respective transmitter and receiver of the physical layer hardware. However, such additional logic will generally not substantially increase the size or power consumption of the hardware, unlike an arrangement in which the physical layer hardware is simply operated with NRZ signaling at the higher data rate. Accordingly, the illustrative embodiment provides a solution that is particularly cost effective.

As indicated previously, the transceivers of a given node pair must both support a specified multilevel amplitude modulated format in order for that format to be used for signaling between the node pair. It should be noted that conventional Fibre Channel link control protocols can be modified in a straightforward manner in order to establish if a given pair of nodes can support a higher data rate, for example, a data rate above 4.25 Gbps, using multilevel amplitude modulated signaling as described herein. For data rates at or below 4.25 Gbps, conventional NRZ signaling may be used.

A given Fibre Channel node in accordance with the invention may therefore be a node configured to provide automatic activation of one of a number of supported signaling formats, such as an NRZ format or a multilevel amplitude modulated format, based on detection of the signaling capabilities of one or more other nodes. As a more particular example, a given node may be configured to switch automatically between utilization of the pulse amplitude modulated format of FIG. 3 and the NRZ signaling format of FIG. 2 responsive to detection of a particular maximum data rate supportable by another node.

Such an arrangement can facilitate support and compatibility for installed backplane infrastructure or other legacy products within a given system, by allowing a node to use NRZ for lower speed transmission, e.g., 1, 2, 4.25 Gbps, and multilevel amplitude modulated signaling for higher speed transmission. Thus, the illustrative embodiments are readily interoperative with legacy systems. This also allows efficient implementation of particular types of systems, such as Fiber Channel Redundant Array of Inexpensive Disks (RAID) systems, at multiple data rates on the order of, e.g., 1, 2, 4.25, 8.50 Gbps, etc.

Figure 4A:
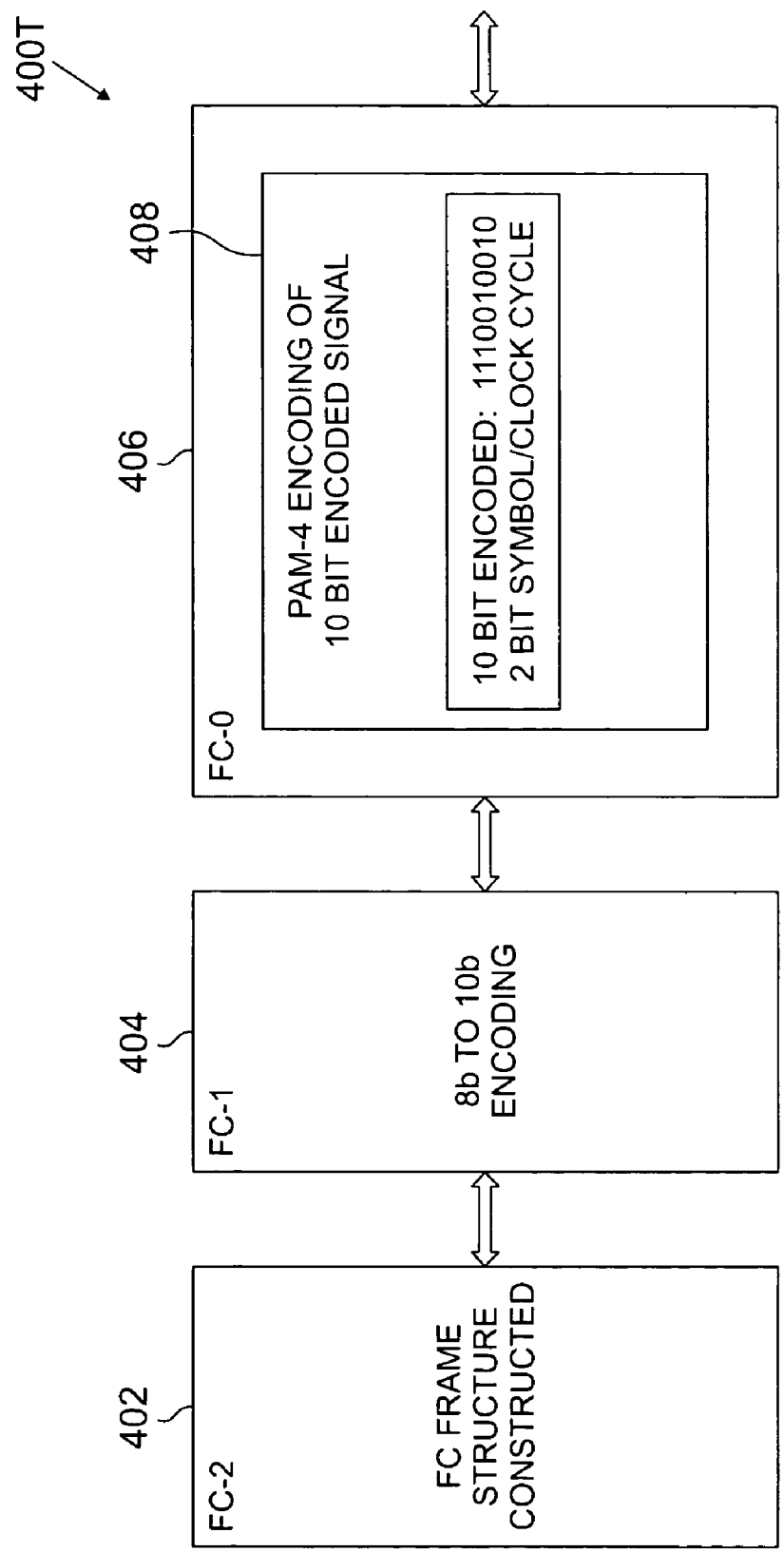
FIGS. 4A and 4B show respective transmitter and receiver portions of a given node pair utilizing Fibre Channel with multilevel amplitude modulated signaling in accordance with an embodiment of the invention.
Figure 4B:
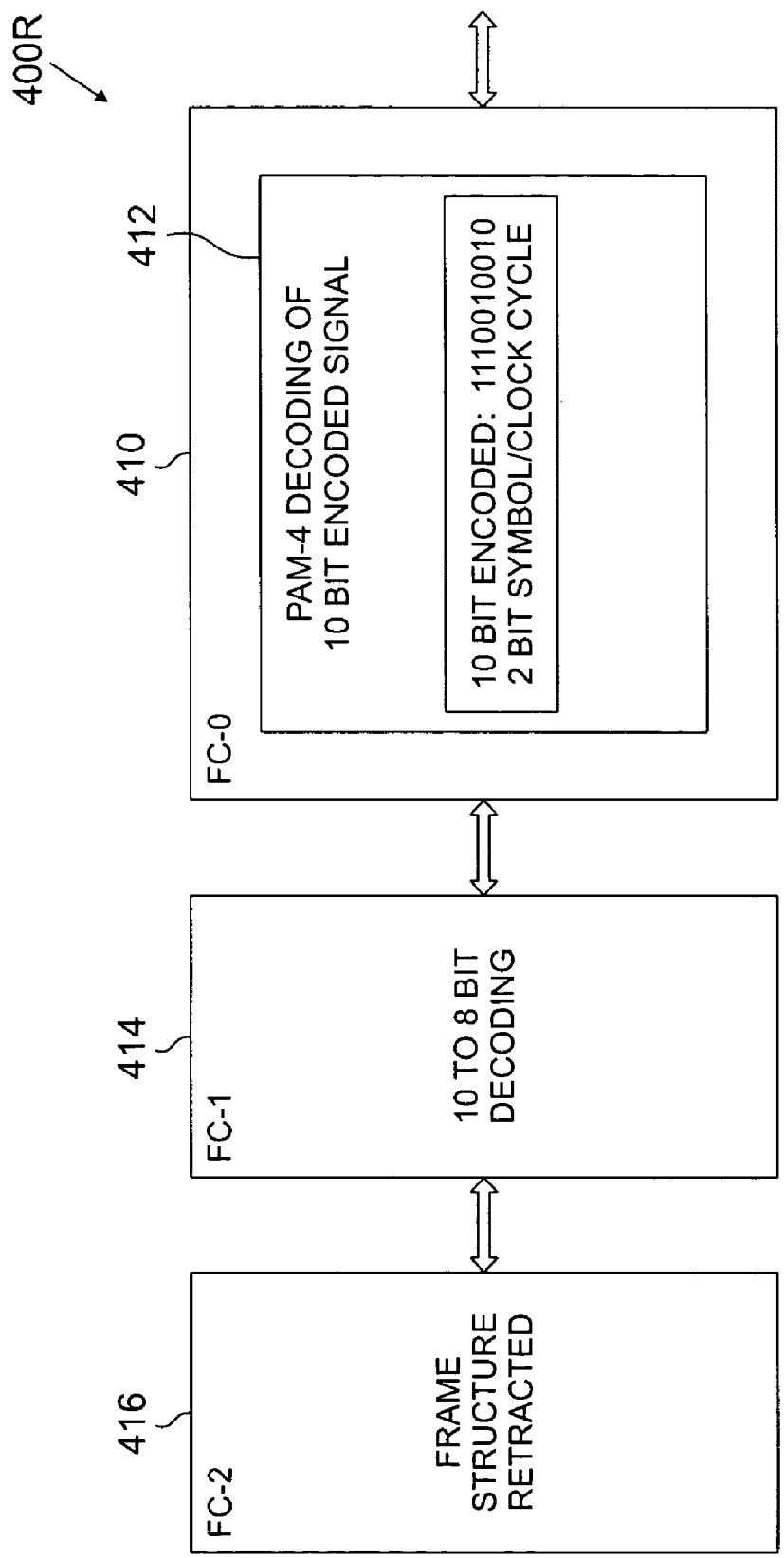

FIGS. 4A and 4B show a transmitter 400T and receiver 400R of a given node pair utilizing Fibre Channel with multilevel amplitude modulated signaling in accordance with an embodiment of the invention. Transmitter 400T is part of one of the nodes of the node pair, and receiver 400R is part of the other node of the node pair. For example, the transmitter 400T may represent at least a portion of either transmitter 102T or 104T of system 100 in FIG. 1, while the receiver 400R may represent at least a portion of a respective receiver 104R or 102R of system 100.

Both the transmitter 400T of FIG. 4A and the receiver 400R of FIG. 4B are illustrated as comprising different elements associated with corresponding FC-2, FC-1 and FC-0 portions of the Fibre Channel standard. These elements may be viewed as different functional blocks of the associated transmitter and receiver hardware, and a given element may be implemented in hardware, software or firmware, or combinations thereof. Also, the various elements, although shown as separate elements in the figure, may run on a single processing platform. Such a platform may comprise, by way of example, a processor and a memory within a given node.

With reference to FIG. 4A, transmitter 400T includes an FC-2 portion 402, an FC-1 portion 404, and an FC-0 portion 406. The FC-2 portion 402 constructs the Fibre Channel frame structure, in a conventional manner described in the standard. The FC-1 portion 404 performs a channel coding operation utilizing conventional eight bit (8 b) to ten bit (10 b) encoding, also as described in the standard. The FC-0 portion 406 comprises a PAM-4 signal generator 408 which performs PAM-4 encoding of the 10 bit encoded signal received from the FC-1 portion. Each pair of bits is encoded as a corresponding multilevel amplitude modulated signal level, also referred to as a symbol, within a given clock cycle. Thus, within a given clock cycle of the PAM-4 signal, a given pair of bits is represented by a corresponding signal level. The figure shows as an illustrative example a particular sequence of 10 bits '1110010010' in which each pair of bits is encoded as a different symbol by the PAM-4 signal generator 408.

The PAM-4 signal generated by transmitter 400T is received by the receiver 400R as shown in FIG. 4B. The receiver 400R includes an FC-0 portion 410, an FC-1 portion 414, and an FC-2 portion 416. The FC-0 portion 410 includes a PAM-4 decoder 412 which decodes the transmitted PAM-4 symbols to recover the bit sequence '1110010010.' The FC-1 portion 414 performs conventional 10 b to 8 b decoding, as described in the standard. The FC-2 portion 416 retracts the frame structure, also as described in the standard. Again, it is to be appreciated that the particular bit pattern shown in FIGS. 4A and 4B is just an example of construction, transmission and retraction of two bits per clock cycle.

As described above, the illustrative embodiment as shown in FIGS. 4A and 4B utilizes a multilevel amplitude modulated signaling format in the FC-0 portions of the transmitter and receiver. Such portions generally correspond to physical layer hardware, such as the above-noted SerDes. The illustrative embodiment does not require changes to other portions or layers as long as transmitting node and receiving node implement complementary multilevel amplitude modulated signaling functionality. The multilevel amplitude modulated signaling in this embodiment will preserve the 10 b encoded data integrity and make it transparent to the FC-1 layer. Accordingly, this arrangement has the advantage of preserving the current Fibre Channel architecture.

Figure 5:
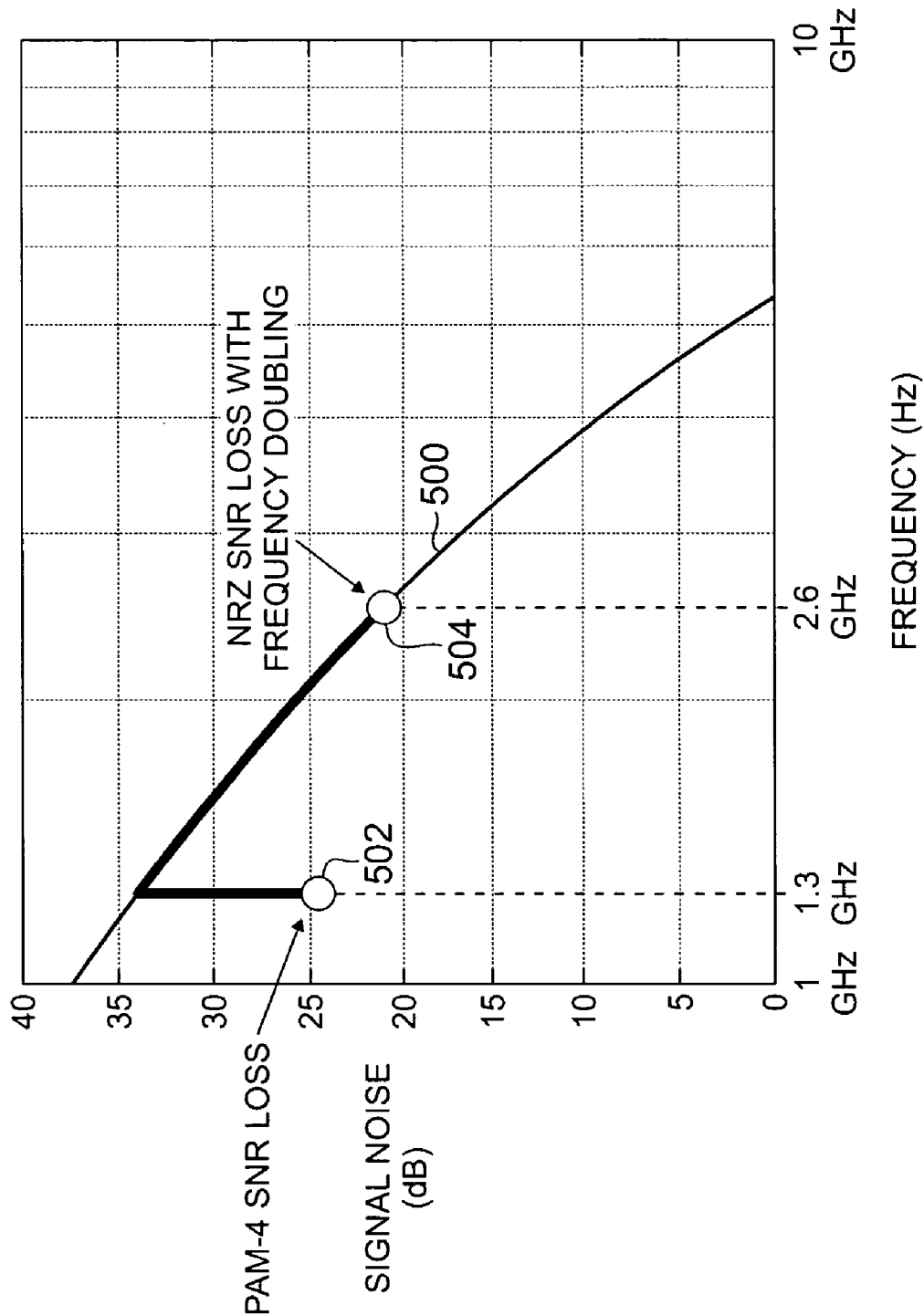
FIG. 5 is a plot of signal-to-noise ratio (SNR) as a function of frequency, comparing four-level amplitude modulated signaling with convention NRZ signaling.

FIG. 5 illustrates the trade-offs in SNR between the PAM-4 and NRZ signaling formats. More specifically, a plot of SNR as a function of frequency is shown. The curve 500 shows the reduction in SNR as a function of increasing frequency for conventional NRZ signaling. Point 502 shows the SNR penalty associated with use of PAM-4 signaling instead of NRZ signaling at a given frequency. It can be seen that there is a penalty of approximately 9.5 dB associated with use of PAM-4 instead of NRZ at the corresponding frequency, although the exact amount of this penalty may vary depending upon factors such as the particular type of coding used in a given embodiment. The penalty is attributable to the use of multiple signaling levels, and the corresponding reduced eye opening as shown in FIG. 3. However, use of PAM-4 also results in a doubling of the effective data rate, while point 504 on curve 500 illustrates that the same doubling in data rate using NRZ signaling will result in a decrease of about 13.6 dB in SNR. Thus, there is an improvement in SNR of about 4.1 dB (given by the difference between the 9.5 dB PAM-4 SNR penalty and the 13.6 dB NRZ frequency doubling penalty), resulting from use of PAM-4 instead of NRZ at the particular frequency values used in this example.

Advantageously, the present invention in the illustrative embodiments described above can accommodate higher Fibre Channel data rates, such as rates above 4.25 Gbps, without requiring substantial increases in physical layer hardware area and power consumption.

The present invention may be implemented in the form of one or more integrated circuits. For example, a given system node in accordance with the invention may be implemented as one or more integrated circuits comprising at least one processor and at least one memory. Numerous other configurations are possible.

In such an integrated circuit implementation, a plurality of identical die are typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

The present invention may also be implemented at least in part in the form of one or more software programs that, within a given node, are stored in memory and run on a processor. Such node processor and memory elements may comprise one or more integrated circuits.

Again, it should be emphasized that the embodiments of the invention as described herein are intended to be illustrative only.

For example, the Fibre Channel interface used in the illustrative embodiments may be replaced with another type of standard serial data channel interface, or a non-standard serial data channel interface, as well as combinations of standard and non-standard interfaces. As a more particular example, and as indicated previously herein, the techniques of the present invention can be adapted in a straightforward manner for use over other types of serial links. Also, the particular arrangements of system devices, signaling levels, modulation types and other features of the illustrative embodiments may be varied in alternative embodiments. These and numerous other alternative embodiments within the scope of the following claims will be readily apparent to those skilled in the art.

What is claimed is:

1. An apparatus for use in a communication system, the apparatus comprising:
   a first node, the first node comprising a transmitter configured for communication with a receiver of a second node of the system and a receiver configured for communication with a transmitter of the second node;
   the first node being configured to generate a signal for transmission over a serial data channel to the second node, the signal having a multilevel amplitude modulated format in which, within a given clock cycle of the signal, multiple bits are represented by a given signal level;
   wherein the first node is configured to provide automatic activation of a particular one of a plurality of supported signaling formats, including the multilevel amplitude modulated format, based on detection of signaling capability of the second node, for use in communication with the second node over the serial data channel; and
   wherein in detecting the signaling capability of the second node, the first node determines if the second node incorporates encoding and decoding logic for the multilevel amplitude modulated format.

2. The apparatus of claim 1 wherein the multilevel amplitude modulated format comprises a four-level amplitude modulated format in which, within the given clock cycle of the signal, a pair of bits is represented by the given signal level.

3. The apparatus of claim 1 wherein the multilevel amplitude modulated format comprises an x-level amplitude modulated format in which, within the given clock cycle of the signal, y bits are represented by the given signal level, where y is related to the number of levels x by the equation $x=2^y$.

4. The apparatus of claim 1 wherein the first node is configured to support a plurality of signaling formats, each associated with a different data rate.

5. The apparatus of claim 4 wherein the plurality of signaling formats includes at least the multilevel amplitude modulated format and a non-return-to-zero (NRZ) signaling format.

6. The apparatus of claim 5 wherein the first node is configured to utilize the NRZ signaling format for data rates up to about 4.25 Gbps, and to utilize the multilevel amplitude modulated format for data rates above about 4.25 Gbps.

7. The apparatus of claim 6 wherein the first node is configured to utilize the multilevel amplitude modulated format to provide at least a doubling of data rate from the data rate supported by the NRZ signaling format.

8. The apparatus of claim 4 wherein the first node is configured to utilize a first one of the signaling formats for a first data rate, and a second one of the signaling formats for a second data rate.

9. The apparatus of claim 4 wherein the first node is configured to switch between utilization of at least a first one of the signaling formats and a second one of the signaling formats responsive to detection of a data rate supported by the second node.

10. The apparatus of claim 1 wherein the first node is implemented at least in part as an integrated circuit.

11. The apparatus of claim 1 wherein the first node generates the signal by:
   framing a bit sequence in a Fibre Channel frame structure;
   channel coding the framed bit sequence; and
   encoding the channel coded framed bit sequence utilizing the multilevel amplitude modulated signaling format.

12. The apparatus of claim 1 wherein the serial data channel comprises a bidirectional serial data channel.

13. The apparatus of claim 1 wherein the first node is configured to communicate with the second node over a Fibre Channel link.

14. An article of manufacture comprising a machine-readable storage medium having one or more software programs stored therein, for use in a communication system having a plurality of nodes, including at least a first node comprising a transmitter configured for communication with a receiver of a second node and a receiver configured for communication with a transmitter of the second node, the first node being operative under control of the one or more software programs to generate a signal for transmission over a serial data channel to the second node, the signal having a multilevel amplitude modulated format in which, within a given clock cycle of the signal, multiple bits are represented by a given signal level, wherein the first node is configured to provide automatic activation of a particular one of a plurality of supported signaling formats, including the multilevel amplitude modulated format, based on detection of signaling capability of the second node, for use in communication with the second node over the serial data channel, and wherein in detecting the signaling capability of the second node, the first node determines if the second node incorporates encoding and decoding logic for the multilevel amplitude modulated format.

15. An integrated circuit for use in a communication system having a plurality of nodes, the integrated circuit implementing at least a portion of a first node, the first node comprising a transmitter configured for communication with a receiver of a second node and a receiver configured for communication with a transmitter of the second node, the first node being configured to generate a signal for transmission over a serial data channel to the second node, the signal having a multilevel amplitude modulated format in which, within a given clock cycle of the signal, multiple bits are represented by a given signal level, wherein the first node is configured to provide automatic activation of a particular one of a plurality of supported signaling formats, including the multilevel amplitude modulated format, based on detection of signaling capability of the second node, for use in communication with the second node over the serial data channel, and wherein in detecting the signaling capability of the second node, the first node determines if the second node incorporates encoding and decoding logic for the multilevel amplitude modulated format.

16. A method for use in a communication system having a plurality of nodes, including at least a first node comprising a transmitter configured for communication with a receiver of a second node and a receiver configured for communication with a transmitter of the second node, the method comprising the steps of:
   generating a signal for transmission over a serial data channel to the second node, the signal having a multilevel amplitude modulated format in which, within a given clock cycle of the signal, multiple bits are represented by a given signal level; and
   transmitting the generated signal;
   wherein the first node is configured to provide automatic activation of a particular one of a plurality of supported signaling formats, including the multilevel amplitude modulated format, based on detection of signaling capability of the second node, for use in communication with the second node over the serial data channel, and
   wherein in detecting the signaling capability of the second node, the first node determines if the second node incorporates encoding and decoding logic for the multilevel amplitude modulated format.

* * * * *